(12) United States Patent
Shimizu

(10) Patent No.: US 12,546,415 B2
(45) Date of Patent: Feb. 10, 2026

(54) PIPE SUPPORT MEMBER

(71) Applicant: Inaba Denki Sangyo Co., Ltd., Osaka (JP)

(72) Inventor: Akira Shimizu, Osaka (JP)

(73) Assignee: Inaba Denki Sangyo Co., Ltd., Osaka (JP)

( * ) Notice: Subject to any disclaimer, the term of this patent is extended or adjusted under 35 U.S.C. 154(b) by 0 days.

(21) Appl. No.: 18/711,160

(22) PCT Filed: Jun. 10, 2022

(86) PCT No.: PCT/JP2022/023439
§ 371 (c)(1),
(2) Date: May 17, 2024

(87) PCT Pub. No.: WO2023/089853
PCT Pub. Date: May 25, 2023

(65) Prior Publication Data
US 2025/0003528 A1    Jan. 2, 2025

(30) Foreign Application Priority Data

Nov. 19, 2021   (JP) ................................. 2021-188611

(51) Int. Cl.
*F16L 3/12*   (2006.01)
*F16L 3/127*   (2006.01)

(52) U.S. Cl.
CPC ................................. *F16L 3/127* (2013.01)

(58) Field of Classification Search
CPC ......... F16B 37/04; F16B 37/045; F16B 41/00
See application file for complete search history.

(56) References Cited

U.S. PATENT DOCUMENTS

| | | | | |
|---|---|---|---|---|
| 624,484 | A | * | 5/1899 | Haskell ..................... F16L 3/12 248/74.1 |
| 628,743 | A | * | 7/1899 | Biggs ........................ F16B 7/04 403/59 |
| 693,861 | A | * | 2/1902 | Hobson ............... B25B 13/5058 81/178 |
| 2,193,758 | A | * | 3/1940 | John ....................... F16L 3/127 248/74.1 |
| 2,252,072 | A | * | 8/1941 | Gerhardt ............... D06F 39/083 D32/12 |
| 2,338,658 | A | * | 1/1944 | Morehouse ........... F16L 3/1233 174/40 CC |
| 2,341,829 | A | * | 2/1944 | Tinnerman ............ F16B 37/041 411/84 |

(Continued)

FOREIGN PATENT DOCUMENTS

| | | |
|---|---|---|
| CN | 205350566 U | 6/2016 |
| JP | 200321125 A | 1/2003 |

(Continued)

*Primary Examiner* — Nkeisha Smith
(74) *Attorney, Agent, or Firm* — The Webb Law Firm

(57) ABSTRACT

A pipe support member (1) that is connected to a base metal fitting (70) fixed to a structure (S) to support a pipe (P), includes a holding portion (11) configured to hold the pipe (P); base fixing portions (13) configured to be fixed to the base metal fitting (70) by fastening a first bolt (B1); and tightening action portions (16) configured to apply a tightening force to the holding portion (11) by fastening a second bolt (B2) different from the first bolt (B1).

10 Claims, 8 Drawing Sheets

(56) References Cited

U.S. PATENT DOCUMENTS

| | | | | | |
|---|---|---|---|---|---|
| 2,352,823 | A | * | 7/1944 | Ellinwood | F16L 3/1233 174/40 CC |
| 2,407,609 | A | * | 9/1946 | Judd | F16B 37/04 411/176 |
| 2,421,443 | A | * | 6/1947 | Torresen | F16L 3/1233 174/40 CC |
| 2,464,620 | A | * | 3/1949 | Tinnerman | F16B 5/0258 24/135 R |
| 2,826,385 | A | * | 3/1958 | Osborn | F16L 3/12 248/300 |
| 2,998,217 | A | * | 8/1961 | Englis | F16L 3/1008 248/222.52 |
| 3,099,054 | A | * | 7/1963 | Spiro | F16L 3/1236 248/74.3 |
| 3,258,822 | A | * | 7/1966 | Schlesch | F16L 41/06 24/284 |
| 3,815,855 | A | * | 6/1974 | Appleton | F16L 3/1233 174/40 CC |
| 4,029,276 | A | * | 6/1977 | Zielie | F16L 3/1033 248/74.1 |
| 4,113,286 | A | * | 9/1978 | Kennedy, Jr. | F16L 3/127 248/62 |
| 4,153,228 | A | * | 5/1979 | Delserro | F16L 3/123 24/19 |
| 5,056,196 | A | * | 10/1991 | van Walraven | E04D 13/08 24/279 |
| 5,170,973 | A | * | 12/1992 | Ohta | B60G 13/006 248/230.2 |
| 5,738,326 | A | * | 4/1998 | Liao | A47C 9/08 248/188.4 |
| 5,893,538 | A | * | 4/1999 | Onishi | F16L 3/2431 248/65 |
| 5,927,810 | A | * | 7/1999 | Liao | A47C 9/08 248/405 |
| 6,557,878 | B2 | * | 5/2003 | Chen | B62K 19/36 280/226.1 |
| 6,672,545 | B1 | * | 1/2004 | Persing | F16L 3/1211 248/58 |
| 8,714,496 | B2 | * | 5/2014 | Blanchard | H02G 3/32 248/65 |
| 8,978,212 | B2 | * | 3/2015 | Krueger | F16L 33/04 24/280 |
| 9,518,684 | B2 | * | 12/2016 | Juzak | F16L 3/1083 |
| 9,625,059 | B2 | * | 4/2017 | Meister | F16L 3/1211 |
| 10,260,659 | B2 | * | 4/2019 | Robinault | F16L 3/123 |
| 11,006,588 | B1 | * | 5/2021 | Jordan | F16L 3/127 |
| 11,371,177 | B2 | * | 6/2022 | Kim | D06F 39/083 |
| 2002/0066833 | A1 | * | 6/2002 | Ferrill | F16L 3/04 248/62 |
| 2007/0040072 | A1 | | 2/2007 | Kageyama et al. | |
| 2014/0061412 | A1 | * | 3/2014 | Suzuki | F16B 37/02 248/226.11 |
| 2015/0252941 | A1 | * | 9/2015 | Sirkin | E04H 17/1417 248/219.4 |
| 2018/0087698 | A1 | * | 3/2018 | Lenn | F16L 21/065 |
| 2020/0072390 | A1 | | 3/2020 | Hwang et al. | |
| 2021/0190238 | A1 | * | 6/2021 | Ortega Gomez | F16L 3/1215 |

FOREIGN PATENT DOCUMENTS

| | | |
|---|---|---|
| JP | 2004232798 A | 8/2004 |
| JP | 201757969 A | 3/2017 |
| JP | 201825290 A | 2/2018 |
| JP | 2019203582 A | 11/2019 |
| NL | 1020580 C | 1/2004 |

* cited by examiner

PIPE SUPPORT MEMBER

CROSS-REFERENCE TO RELATED APPLICATIONS

This application is the United States national phase of International Patent Application No. PCT/JP2022/023439 filed Jun. 10, 2022, and claims priority to Japanese Patent Application No. 2021-188611 filed Nov. 19, 2021, the disclosures of which are hereby incorporated by reference in their entireties.

BACKGROUND OF THE INVENTION

Field of the Invention

The present invention relates to a pipe support member.

Description of Related Art

In an air conditioner installed in a structure such as a building, for example, a refrigerant pipe may be disposed over from an outdoor unit installed outdoors to an indoor unit installed indoors. In this case, for example, in a case of heating operation, there is a possibility that the refrigerant pipe extends in an axial direction due to thermal expansion, and a load corresponding to an extension amount is applied to a bending portion (so-called elbow portion) on an end portion side of the refrigerant pipe. In particular, in a case in which the refrigerant pipe is disposed in an up-down direction, a load due to a weight of the refrigerant pipe may be added, and thus there is a possibility that a large load is applied to the above-described bending portion. In order to address such a concern, a part of the refrigerant pipe in the axial direction is fixed by using a pipe support member that is connected to a base metal fitting fixed to a structure, and the movement of the refrigerant pipe in the axial direction at the fixing location is prevented. By dispersing the extension amount of the pipe member due to thermal expansion on both sides in the axial direction with the fixing location as a center, a load on the bending portion on the lower end side is reduced.

An example of the pipe support member is disclosed in Japanese Patent Application Laid-Open No. 2018-25290. The pipe support member includes a pair of clamp members 71 having slit-shaped engaging holes 73, and a pipe member P is supported by locking a flange portion 31 of a mounting member 1 fixed to an outer peripheral surface of the pipe member P with the engaging hole 73. The fixing of the mounting member 1 to the pipe member P is performed by welding means such as brazing.

However, welding construction such as brazing requires a certain level of skill, and there is a possibility that the quality of the construction may vary depending on the skill of an operator. In addition, it is common that a plurality of pipe members P is disposed in the structure, and the number of the fixing locations of the mounting member 1 on the pipe member P is large in the entire structure as a construction target. In a case in which all of them are performed by welding means, there is a problem that a large amount of labor is required and the work efficiency is poor.

SUMMARY OF THE INVENTION

There is a demand for a pipe support member that is able to be used to efficiently perform work during construction and that is able to appropriately support a pipe in a homogeneous manner regardless of the skill of an operator.

A pipe support member according to an aspect of the present invention is a pipe support member that is connected to a base metal fitting fixed to a structure to support a pipe, and includes a holding portion configured to surround an outer peripheral surface of the pipe to hold the pipe; base fixing portions configured to extend from the holding portion to face each other and be fixed to the base metal fitting by fastening a first bolt; and tightening action portions configured to extend from the holding portion to face each other and apply a tightening force to the holding portion by fastening a second bolt different from the first bolt.

According to this configuration, as the base fixing portions are fixed to the base metal fitting, the pipe is able to be directly held by the holding portion by surrounding the outer peripheral surface of the pipe with the holding portion. For example, it is not necessary to interpose a member having a flange portion between the pipes by welding, and the construction is able to be performed only by the bolt operation, so that the work efficiency is good. In addition, since there is little variation in the skill of the operator in the case of only the bolt operation, it is possible to make the construction uniform. Further, since the tightening action portion is provided separately from the base fixing portion that is fixed to the base metal fitting, in addition to the normal holding of the pipe by the holding portion accompanying the fastening of the first bolt, an additional tightening force is able to be applied to the holding portion by the fastening of the second bolt. As a result, it is possible to increase the surface pressure due to an inner surface of the holding portion and appropriately support the pipe.

Hereinafter, suitable aspects of the present invention will be described. However, the scope of the present invention is not limited by the suitable examples of the aspects described below.

As one aspect, it is preferable that the tightening action portions apply the tightening force to the holding portion in a state in which two boundary portions between the holding portion and a pair of the tightening action portions are spaced apart from each other.

According to this configuration, the second bolt is able to be fastened while leaving a certain amount of tightening allowance between the pair of the tightening action portions, so that a sufficient tightening force is able to be applied to the holding portion. Therefore, the pipe is able to be stably supported.

As one aspect, it is preferable that the tightening action portions include tightening main body portions to which the second bolt is fastened, and have proximity restricting portions configured to abut against each other during fastening by the second bolt on a side opposite to the holding portion with respect to a fastening position by the second bolt in the tightening main body portions to maintain a certain distance between the tightening main body portions.

According to this configuration, when the second bolt is fastened, the proximity restricting portion is a fulcrum, the tightening main body portions facing each other with a certain distance therebetween is able to be more firmly sandwiched and held, and thus a greater tightening force is able to be applied to the holding portion. As a result, the surface pressure by the inner surface of the holding portion is able to be further increased, and the pipe is able to be firmly supported.

As one aspect, it is preferable that the proximity restricting portions are formed of distal end bending portions that are formed by bending distal ends of the tightening main body portions.

According to this configuration, the proximity restricting portion for maintaining a certain distance between the tightening main body portions is able to be appropriately configured with a simple structure of bending the distal end of the tightening main body portion.

As one aspect, it is preferable that respective distal end bending portions constituting a pair of the tightening action portions abut against each other in a state of intersecting with each other.

According to this configuration, the tightening force due to the fastening of the second bolt is able to be uniformly applied to the pair of tightening action portions. As a result, the pipe is able to be stably supported with almost no deformation or deviation of the tightening action portion.

As one aspect, it is preferable that the holding portion, the base fixing portions, and the tightening action portions are integrally formed, and a notch portion for preventing the tightening force by the fastening of the second bolt from being transmitted to a base fixing portion side is provided between the base fixing portions and the tightening action portions.

According to this configuration, for example, the pipe support member is able to be easily formed by punching and bending one metal plate. In addition, by the notch portion provided between the base fixing portion and the tightening action portion, the tightening force due to the fastening of the second bolt is appropriately directed to the holding portion side. Therefore, the pipe is able to be firmly supported.

As one aspect, it is preferable that each of the tightening action portions is provided adjacent to at least one of an upper side and a lower side of the base fixing portion, and the tightening action portions abut against the base metal fitting in a state in which the base fixing portions are fixed to the base metal fitting.

According to this configuration, the tightening action portion provided adjacent to at least one of the upper side and the lower side of the base fixing portion abuts against the base metal fitting and functions as a strength receiving portion with respect to the base metal fitting. Therefore, the pipe is able to be stably supported.

As one aspect, it is preferable that the pipe support member further includes fixing auxiliary members configured to temporarily fix the base fixing portions to the base metal fitting before the fastening by the first bolt.

According to this configuration, the operator is able to perform the fastening operation with the first bolt in a state in which both hands are free in a state in which the base fixing portion is temporarily fixed to the base metal fitting by the fixing auxiliary member.

Therefore, the workability is able to be improved.

As one aspect, it is preferable that the fixing auxiliary members are made of a resin and serve as a spacer for preventing the base metal fitting and the base fixing portions from directly coming into contact with each other.

According to this configuration, for example, the fixing auxiliary member for temporary fixing is able to be formed relatively simply by injection molding or the like. In addition, since the fixing auxiliary member made of the resin having a low thermal conductivity is interposed between the base metal fitting and the base fixing portion, it is possible to suppress the condensation on the surface of the base metal fitting.

Further features and advantages of the present invention will be apparent from the following exemplary and non-limited description of embodiments with reference to the accompanying drawings.

DESCRIPTION OF THE INVENTION

First Embodiment

Figure 1:
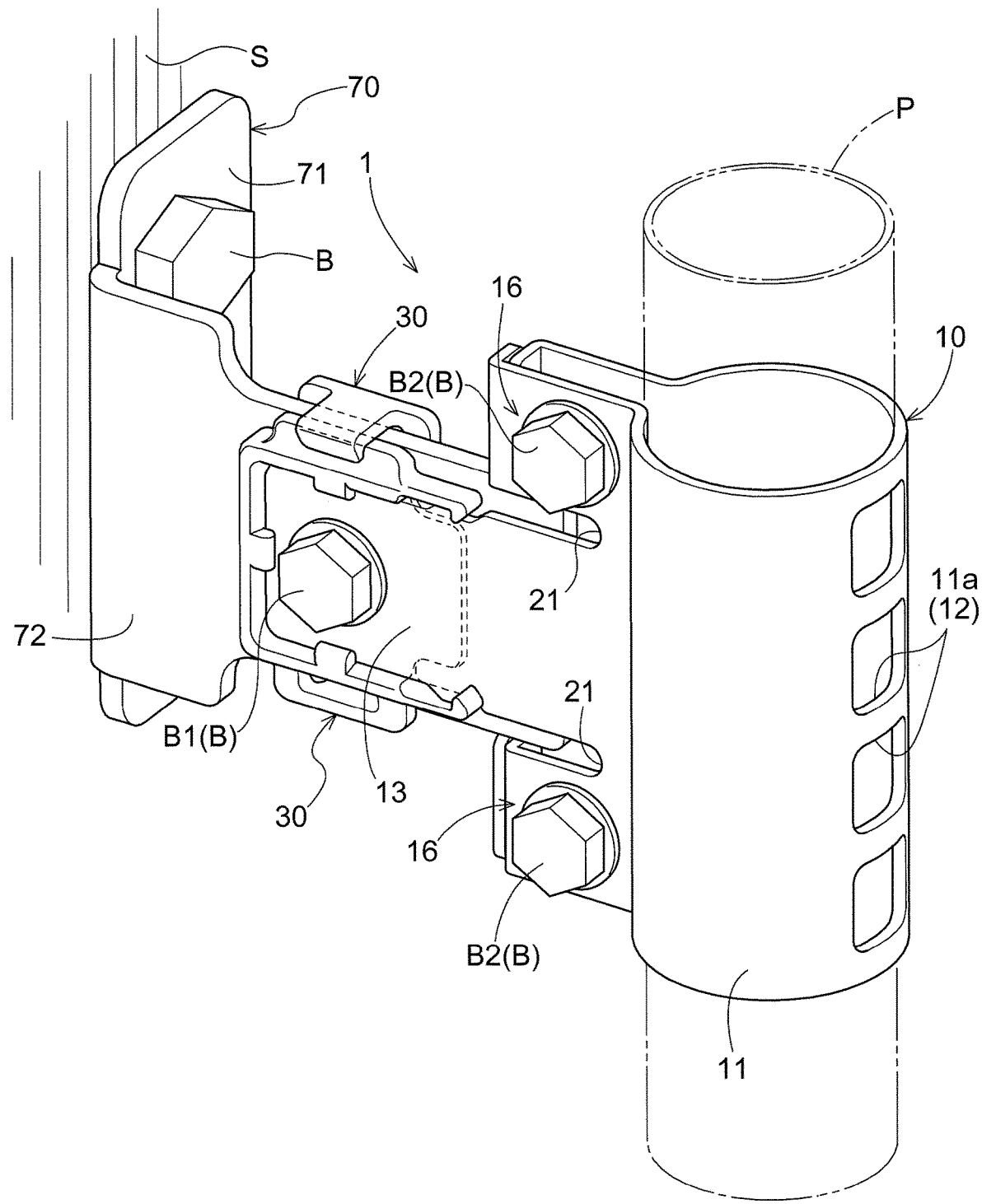
FIG. 1 is a perspective view of a pipe fixing structure using a pipe support member according to a first embodiment.

A first embodiment of the pipe support member will be described with reference to the accompanying drawings. As illustrated in FIG. 1, a pipe support member 1 according to the present embodiment is used for supporting a pipe P by being connected to a base metal fitting 70 fixed to a structure S.

In the following description, although terms "axial direction", "circumferential direction", and "radial direction" may be used to represent a shape, a positional relationship, and the like of the respective members, these terms are defined with reference to the pipe P which is a support target supported by the pipe support member 1. That is, the "axial direction" represents an axial core direction (longitudinal direction) of the pipe P, the "circumferential direction" represents a direction that surrounds a periphery of the pipe P, and the "radial direction" represents a direction that radially extends from an axial core of the pipe P. Unless otherwise specified, the reference to each of these directions in the description of each part of the pipe support member 1 is intended to refer to a direction in a state in which the pipe P is actually held.

The pipe support member 1 according to the present embodiment is used, for example, for the pipe P that is disposed over from an outdoor unit of an air conditioner installed on a roof of a structure such as a building to a plurality of indoor units installed indoors. An example of the pipe P is a copper refrigerant pipe.

FIG. 1 illustrates an example of a pipe fixing structure in which a predetermined portion of the pipe P disposed in a vertical direction (up-down direction) is fixed to a structure S by using the pipe support member 1 according to the present embodiment. This pipe fixing structure is used to suppress the pipe P from moving relative to the structure S in the axial direction at the fixing location. The structure S is, for example, a frame, an outer wall, or the like of the structure.

Figure 2:
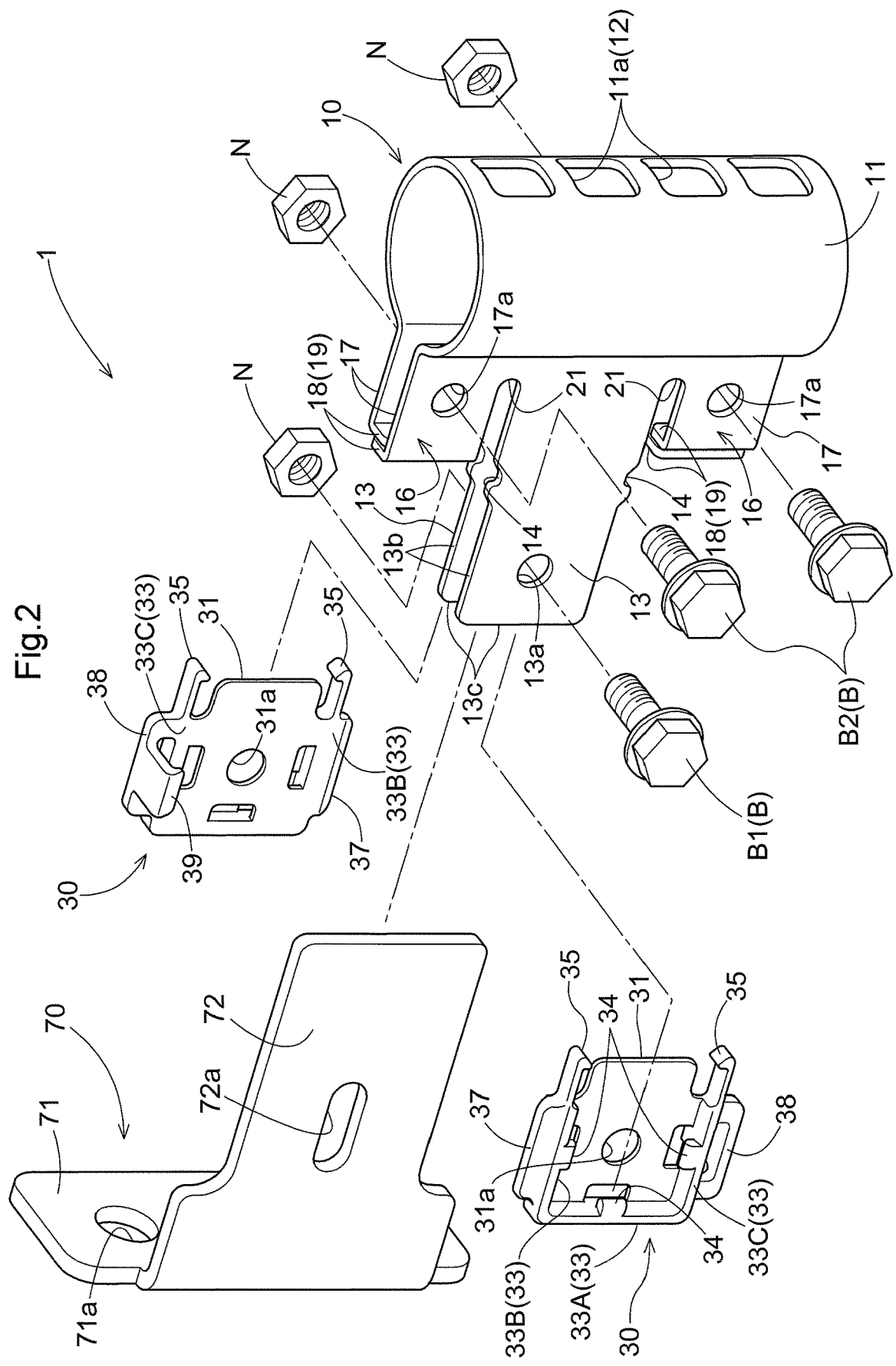
FIG. 2 is an exploded perspective view of the pipe support member.

The base metal fitting 70 is fixed to the structure S. The base metal fitting 70 may be directly fixed to the structure S, or may be indirectly fixed thereto via another member (for example, an interposing member such as a bracket). The base metal fitting 70 is made of metal and is configured using, for example, a hot-rolled soft steel plate or the like. As illustrated in FIGS. 1 and 2, the base metal fitting 70 is formed in a bent plate shape. The base metal fitting 70 includes an attachment base portion 71 that is able to be fitted into a surface contact state with the structure S (or the interposing member), and a connecting portion 72 that is provided to extend in a state of intersecting (in the present example, orthogonal to) the attachment base portion 71. Insertion holes 71a and 72a into which bolts B are inserted are formed in the attachment base portion 71 and the connecting portion 72, respectively.

The pipe support member 1 is connected to the base metal fitting 70 to support the pipe P. The pipe support member 1 supports the pipe P that is disposed along the up-down direction at one portion in the axial direction (up-down direction). As illustrated in FIGS. 1 and 2, the pipe support member 1 includes a restraint member 10 and a fixing auxiliary member 30. In the present embodiment, the pipe support member 1 includes one restraint member 10 and two fixing auxiliary members 30. The fixing auxiliary member 30 is attachably and detachably attached to the restraint member 10.

The pipe support member 1 (specifically, the restraint member 10 constituting the pipe support member 1) includes a holding portion 11, a base fixing portion 13, and a tightening action portion 16. These are integrally formed. The restraint member 10 is made of metal and is configured using, for example, a hot-rolled soft steel plate or the like.

Figure 3:
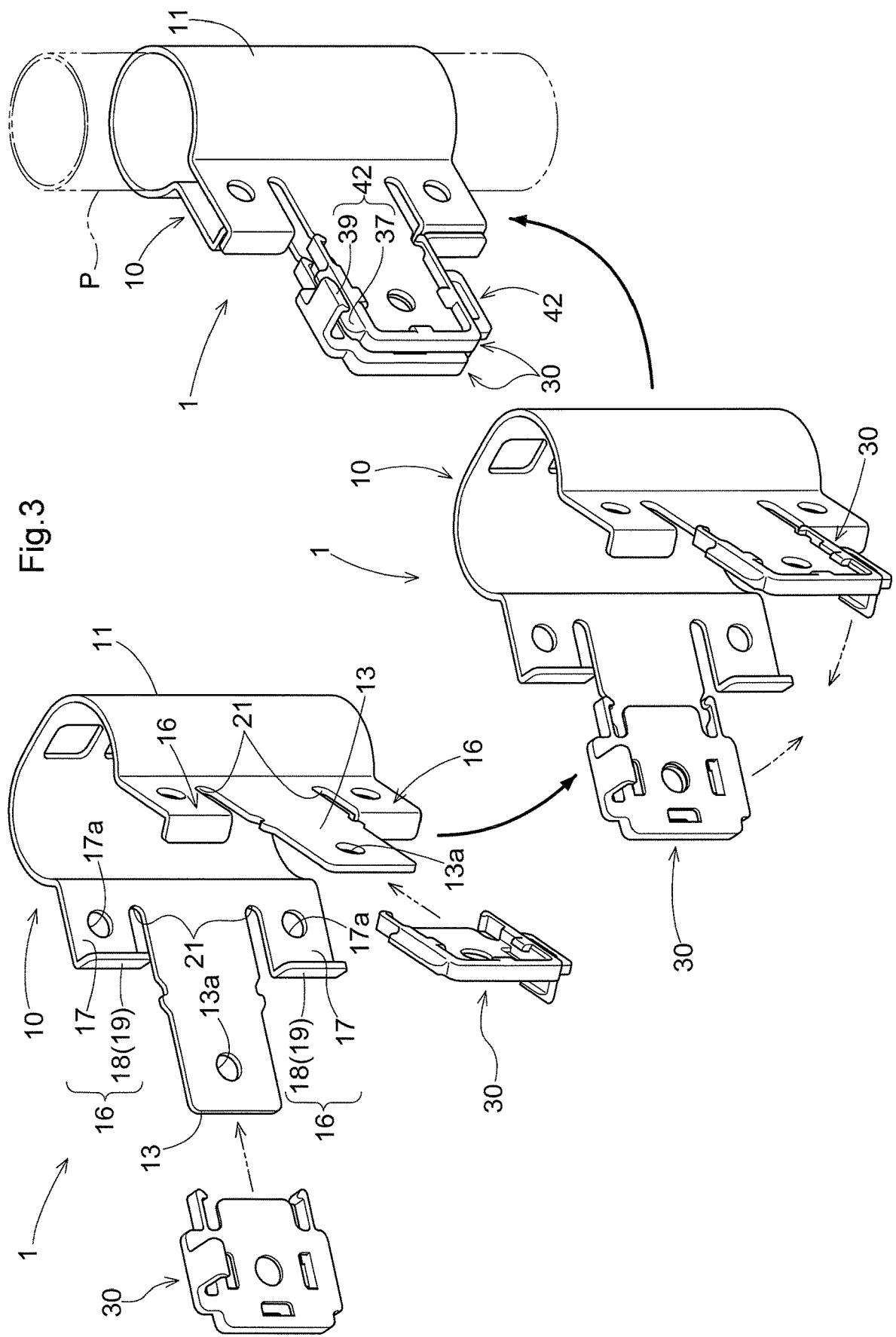
FIG. 3 is a perspective view illustrating a method of using the pipe support member.

The holding portion 11 is a portion for holding the pipe P. The holding portion 11 is formed in a substantially cylindrical shape that is not completely closed. An inner diameter of the holding portion 11 is set to be equal to or substantially equal to an outer diameter of the pipe P. As illustrated in FIG. 3, in a state before use, the holding portion 11 is not formed in a shape that extends along a true circle as viewed in the axial direction, and is somewhat expanded (opening posture). The holding portion 11 is able to be attached to the pipe P from an expanded opening from the outer side in the radial direction. Thereafter, the holding portion 11 is deformed into a closed posture by applying an external force to close the expanded holding portion 11, and a first bolt B1 and a second bolt B2 are further tightened as described below, whereby the holding portion 11 surrounds the outer peripheral surface of the pipe P to hold the pipe P.

As illustrated in FIGS. 1 and 2, a through-hole 11a is formed in the holding portion 11. The through-hole 11a is formed in a portion of the holding portion 11 on a side opposite to the base fixing portion 13 and the tightening action portion 16. In the present embodiment, a plurality of through-holes 11a is formed along the axial direction (is arranged up and down). The through-hole 11a functions as a bending strength adjusting portion 12 for adjusting the magnitude of the bending strength of the restraint member 10 (specifically, the holding portion 11 constituting the restraint member 10).

The base fixing portion 13 is a portion to be fixed to the base metal fitting 70. The base fixing portion 13 is configured of a pair of plate portions that extends from the holding portion 11 to face each other. In the present embodiment, each of the pair of plate portions constituting the base fixing portion 13 extends in the radial direction from both end portions of the holding portion 11 having a substantially cylindrical shape that is not completely closed in the circumferential direction. The base fixing portion 13 is formed in an elongated rectangular shape. An insertion hole 13a into which the bolt B (specifically, the first bolt B1) is inserted is formed in the base fixing portion 13. The base fixing portion 13 is fixed to the base metal fitting 70 by fastening the first bolt B1. A shaft portion of the first bolt B1 is inserted into two insertion holes 13a of the base fixing portion 13 and the insertion hole 72a of the base metal fitting 70, and is screwed into a nut N on the opposite side to be fastened, whereby the base fixing portion 13 is fixed to the base metal fitting 70.

In addition, on upper and lower side edges 13b of the pair of plate portions constituting the base fixing portion 13, locking recess portions 14 recessed toward a center line side of the base fixing portion 13 are formed, respectively. A locking claw portion 35 of the fixing auxiliary member 30 is locked in the locking recess portion 14 (see FIG. 4).

The tightening action portion 16 is a portion for applying a tightening force to the holding portion 11. The tightening action portion 16 is configured of a pair of plate portions that extends from the holding portion 11 to face each other. In the present embodiment, each of the pair of plate portions constituting the tightening action portion 16 extends in the radial direction from both end portions of the holding portion 11 having a substantially cylindrical shape that is not completely closed in the circumferential direction. An extending length of the tightening action portion 16 from the holding portion 11 is shorter than an extending length of the base fixing portion 13. In the present embodiment, two tightening action portions 16 are provided to be separated up and down with the base fixing portion 13 interposed therebetween.

The tightening action portion 16 includes a tightening main body portion 17 and a distal end bending portion 18. The tightening main body portion 17 is a main part of the tightening action portion 16. In the present embodiment, the tightening main body portion 17 is formed in a substantially square shape. The insertion hole 17a into which the bolt B (specifically, the second bolt B2 different from the first bolt B1) is inserted is formed in the tightening main body portion 17. The tightening main body portion 17 is a portion where the second bolt B2 is fastened in the tightening action portion 16. In the present embodiment, the second bolt B2 is fastened at a position closer to the holding portion 11 than the first bolt B1.

The shaft portion of the second bolt B2 is inserted into the insertion hole 17a of the tightening main body portion 17 and is screwed into the nut N on the opposite side to be fastened, whereby a tightening force is able to be applied to the holding portion 11. As a result, a surface pressure of an inner surface of the holding portion 11 is able to be increased, and the pipe P is able to be appropriately supported. For example, since the welding process such as brazing is not required and the construction is able to be performed only by the tightening operation of the bolts B (first bolt B1 and second bolt B2), the work efficiency is good. The bolt operation is also able to be performed with an electric drill, and in this case, the work efficiency is able to be significantly improved. In addition, since the pipe P is held by the holding portion 11 with the surface pressure, the pipe P is not oxidized or deformed (for example, a recess due to bite is generated), and the reliability is high.

The distal end bending portion 18 is a portion where the distal end portion of the tightening main body portion 17 on the side opposite to the holding portion 11 is bent. The distal end bending portion 18 is bent with respect to the tightening main body portion 17 substantially perpendicularly. The distal end bending portions 18 are bent to face each other from the tightening main body portions 17 facing each other, and the distal end bending portions 18 overlap each other. The distal end of one distal end bending portion 18 is configured to abut against the tightening main body portion 17 continuous from the other distal end bending portion 18 when being fastened by the second bolt B2.

As described above, the distal end bending portions 18 are provided on the opposite side of the holding portion 11 with respect to the fastening position (that is, the position of the insertion hole 17a) by the second bolt B2 in the tightening main body portions 17, and abut against each other during the fastening by the second bolt B2. Due to this abutment, the distal end bending portion 18 applies to maintain a certain distance between the tightening main body portions 17 during the fastening by the second bolt B2. As a result, when the second bolt B2 is fastened, a contact point between the distal end bending portion 18 and the tightening main body portion 17 serves as a fulcrum, and the tightening main body portions 17 facing each other with a certain distance therebetween is able to be more firmly sandwiched and held, and thus a greater tightening force is able to be applied to the holding portion 11. In this manner, the surface pressure by the inner surface of the holding portion 11 is able to be further increased, and the pipe P is able to be firmly supported.

In the present embodiment, the distal end bending portions 18 function as proximity restricting portions 19 that abut against each other during the fastening by the second bolt B2 to maintain a certain distance between the tightening main body portions 17.

In the present embodiment, by including such a distal end bending portion 18 (proximity restricting portion 19), the pair of facing tightening action portions 16 apply the tightening force to the holding portion 11 in a state in which root portions thereof (boundary portions with the holding portion 11) are spaced apart from each other. The root portions of the pair of tightening action portions 16 are spaced from each other in a state in which the second bolt B2 is completely fastened. A separation width between the root portions of the pair of tightening action portions 16 is preferably equal to or more than a plate thickness of the base metal fitting 70, more preferably equal to or more than 1.5 times the plate thickness, and still more preferably equal to or more than 1.8 times the plate thickness.

Figure 4:
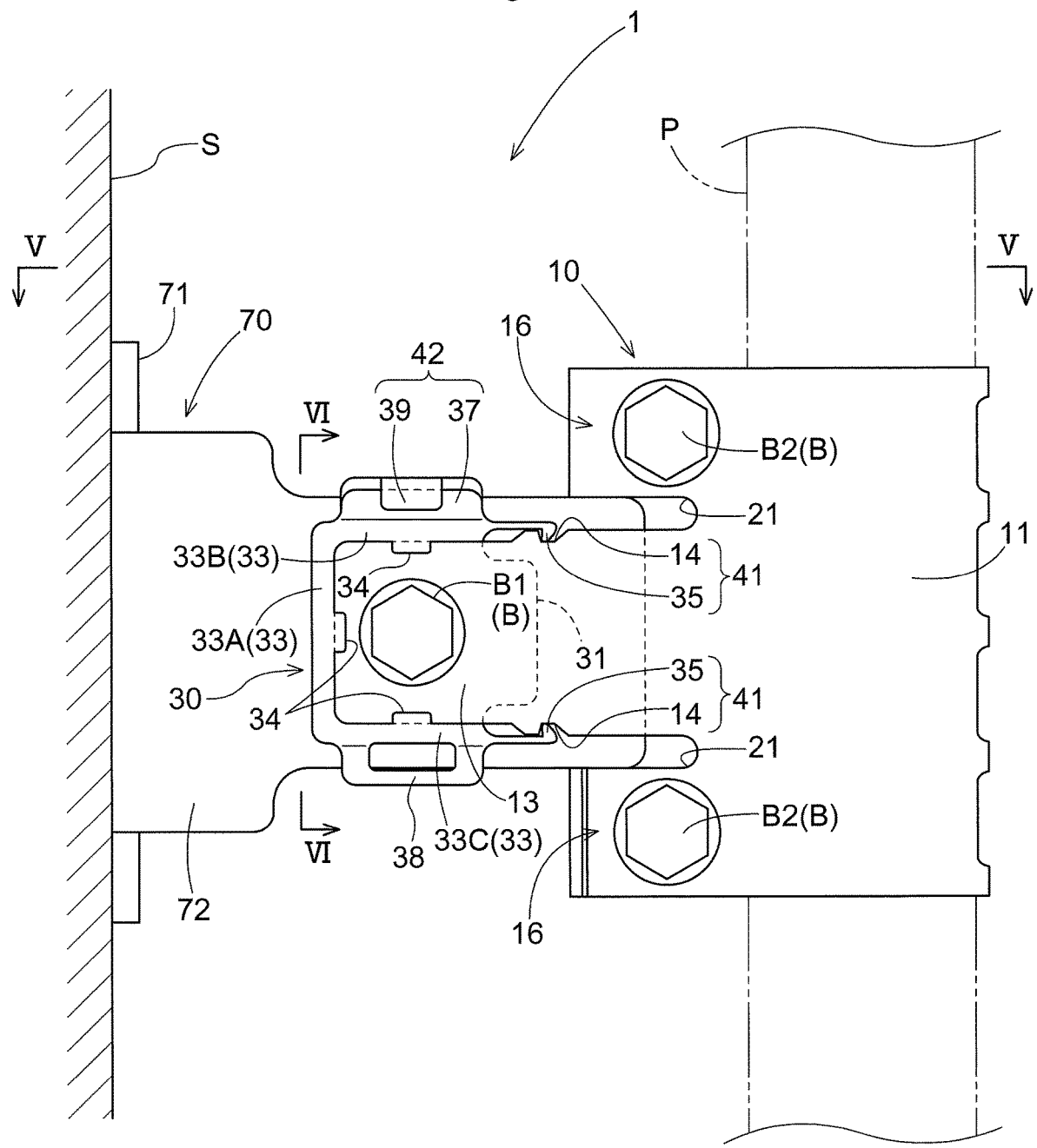
FIG. 4 is a front view of a pipe fixing structure.

As illustrated in FIG. 4, the two tightening action portions 16 provided to be separated up and down with the base fixing portion 13 interposed therebetween abut against the base metal fitting 70 from above and below in a state in which the base fixing portion 13 is fixed to the base metal fitting 70. In the present embodiment, the distal end bending portion 18 constituting the tightening action portion 16 abuts against the connecting portion 72 of the base metal fitting 70 from above and below in an intersecting state (in the present example, orthogonal). With such a configuration, since the two tightening action portions 16 (distal end bending portions 18) function as strength receiving portions with respect to the base metal fitting 70, the pipe P is able to be stably supported.

In the present embodiment, a notch portion 21 is provided between the base fixing portion 13 and each of the two tightening action portions 16. The notch portion 21 is formed to be continuous from the upper and lower side edges 13b of the base fixing portion 13 and to extend along the radial direction. By providing such a notch portion 21, the base fixing portion 13 and the two tightening action portions 16 are able to be cut off, and the tightening force of the tightening action portion 16 exerted by the fastening of the second bolt B2 is able to be prevented from being transmitted to a base fixing portion 13 side. In other words, the tightening force of the tightening action portion 16 exerted by the fastening of the second bolt B2 is able to be appropriately directed to the holding portion 11 side. Therefore, the pipe P is able to be further firmly supported.

As illustrated in FIGS. 2 and 3, the pipe support member 1 according to the present embodiment includes the fixing auxiliary member 30 attachably and detachably provided to the restraint member 10. The fixing auxiliary member 30 includes a main body portion 31, a side wall portion 33, a pressing protrusion 34, a locking claw portion 35, a first extending portion 37, a second extending portion 38, and an engagement claw portion 39. These are integrally formed. The fixing auxiliary member 30 is made of a resin and is formed of, for example, polypropylene, polyacetal, or the like.

The main body portion 31 is formed in a flat plate shape along the base fixing portion 13 of the restraint member 10. In addition, the main body portion 31 is formed in a rectangular shape. An insertion hole 31a into which the bolt B (specifically, the first bolt B1) is inserted is formed in the main body portion 31. The main body portion 31 is disposed along the inner surface of each of the pair of plate bodies constituting the base fixing portion 13 in a state in which the fixing auxiliary member 30 is mounted on the restraint member 10 (hereinafter, simply referred to as a "mounted state").

The side wall portion 33 is formed to stand up perpendicularly from the main body portion 31 along three sides of the rectangular main body portion 31. The side wall portion 33 includes a first portion 33A, and a second portion 33B and a third portion 33C that extend from both end portions of the first portion 33A, respectively. The first portion 33A abuts against an end edge 13c of the base fixing portion 13 on a side opposite to the holding portion 11 in the mounted state. The second portion 33B and the third portion 33C abut against upper and lower side edges 13b of the base fixing portion 13 in the mounted state.

The pressing protrusion 34 is formed at the center of each of the first portion 33A, the second portion 33B, and the third portion 33C of the side wall portion 33. The pressing protrusion 34 is formed to protrude to the center side at a position separated from the main body portion 31 by a plate thickness of the base fixing portion 13 of the restraint member 10. The pressing protrusion 34 abuts against an outer surface of each of the pair of plate bodies constituting the base fixing portion 13 in the mounted state. As a result, in the mounted state, the main body portion 31 and the pressing protrusion 34 cooperate with each other to press the pair of plate bodies constituting the base fixing portion 13 from both the inner and outer sides.

The locking claw portion 35 is formed to extend continuously from the second portion 33B and the third portion 33C of the side wall portion 33. The locking claw portion 35 is locked in the locking recess portion 14 formed on the upper and lower side edges 13b of the pair of plate portions constituting the base fixing portion 13 in the mounted state (see FIG. 4). As a result, it is possible to prevent the fixing auxiliary member 30 mounted on the restraint member 10 from coming off. In the present embodiment, the locking recess portion 14 of the base fixing portion 13 and the locking claw portion 35 of the fixing auxiliary member 30 cooperate with each other to function as a stopper portion 41 that prevents the fixing auxiliary member 30 mounted on the restraint member 10 from being detached.

The first extending portion 37 extends outward from the second portion 33B of the side wall portion 33. The second extending portion 38 extends outward from the third portion 33C of the side wall portion 33. An extending direction of the first extending portion 37 and an extending direction of the second extending portion 38 are opposite to each other. The engagement claw portion 39 is provided at the distal end portion of the second extending portion 38 in a state of intersecting (in the present example, orthogonal) the second extending portion 38.

Figure 5:
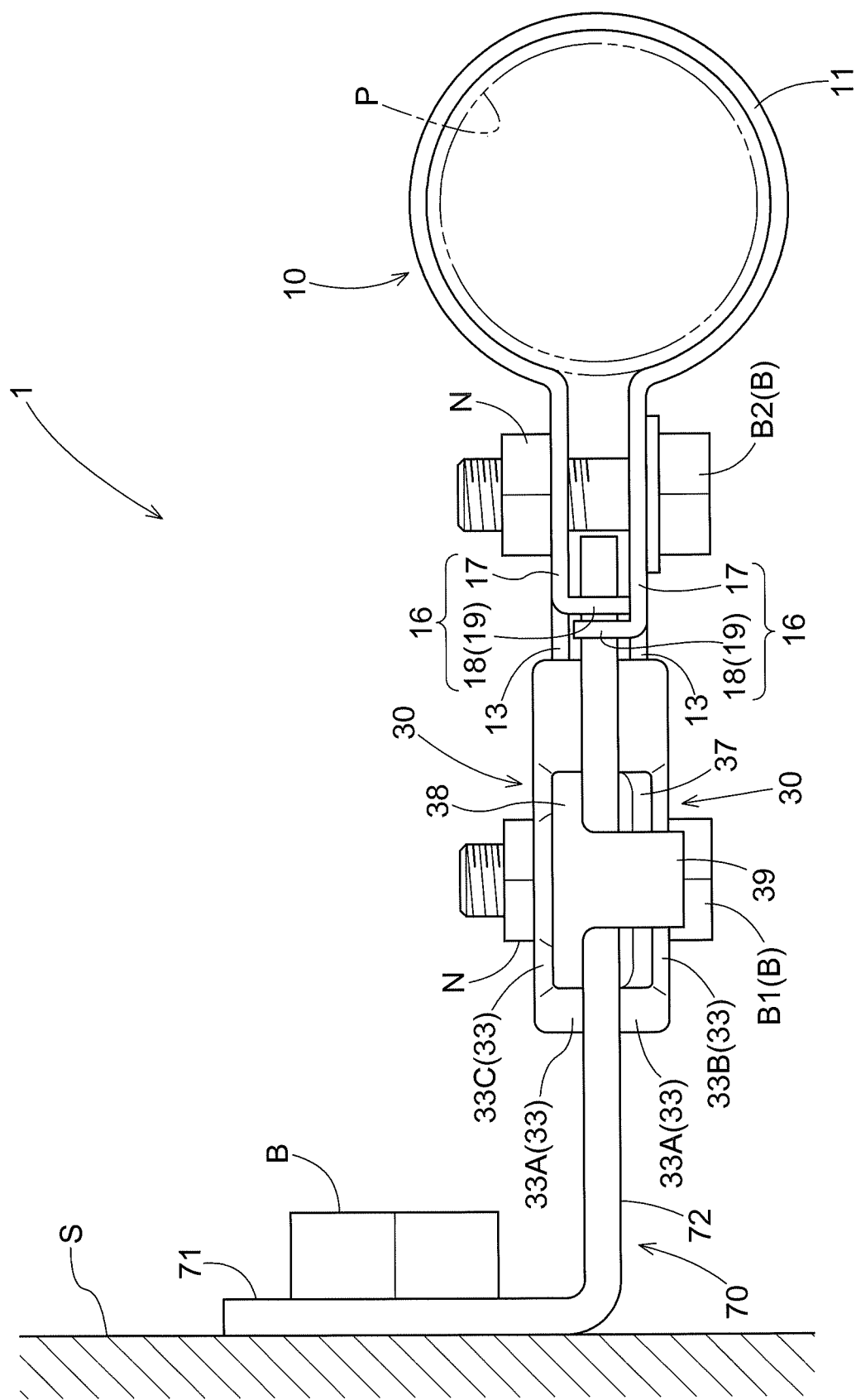
FIG. 5 is a plan view of the pipe fixing structure.
Figure 6:
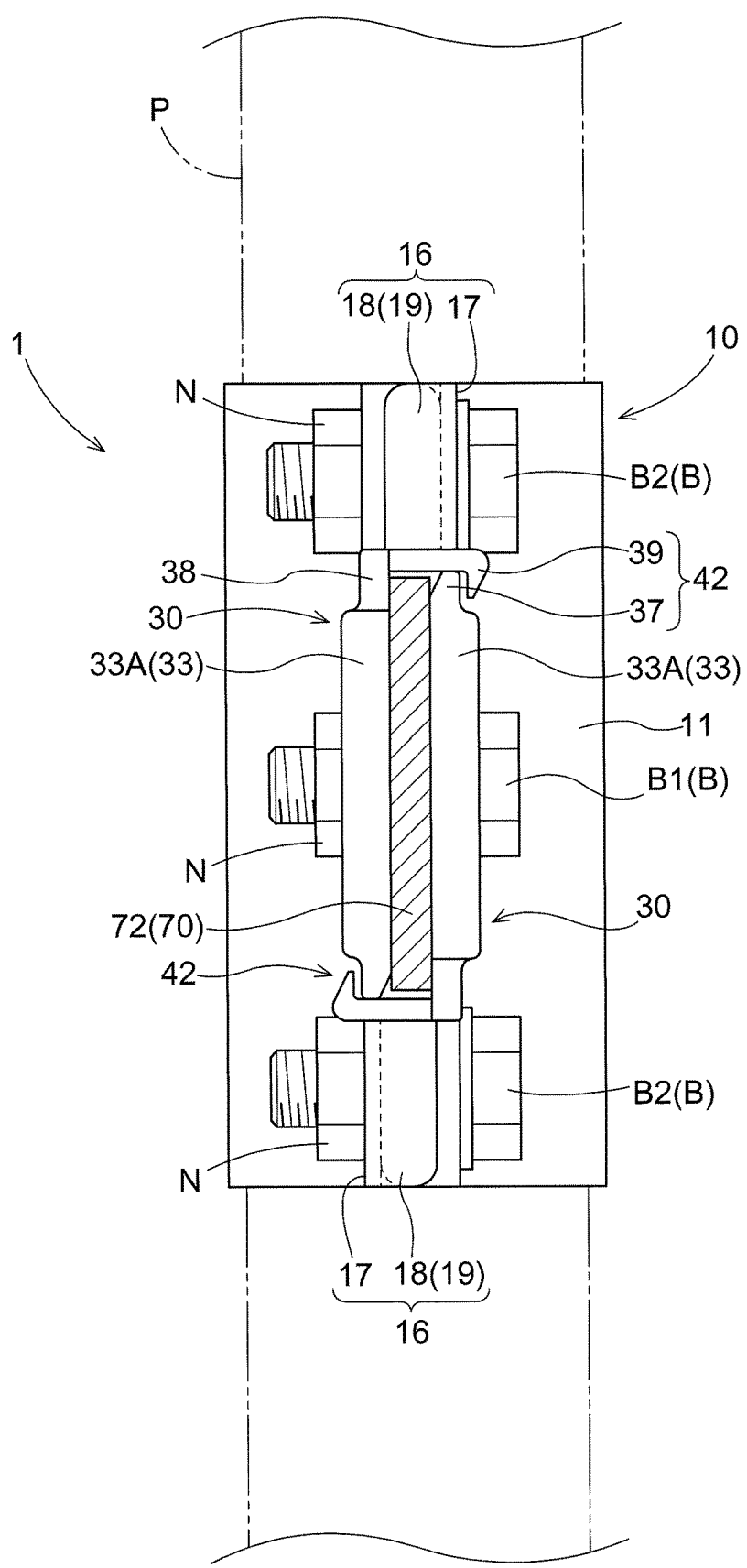
FIG. 6 is a side view of the pipe fixing structure.

In the present embodiment, the fixing auxiliary members 30 having the same shape are mounted on the pair of plate bodies constituting the base fixing portion 13, respectively. Then, when the restraint member 10 is put into the closed posture, as illustrated in FIGS. 4 to 6, the engagement claw portion 39 of one fixing auxiliary member 30 is engaged with the first extending portion 37 of the other fixing auxiliary member 30, and the engagement claw portion 39 of the other fixing auxiliary member 30 is engaged with the first extending portion 37 of one fixing auxiliary member 30. As a result, even if the operator releases the hand, the restraint member 10 is in a state in which the closed posture is held. In the present embodiment, the first extending portion 37 and the engagement claw portion 39, which are provided separately in the two fixing auxiliary members 30, cooperate with each other to function as a closed posture holding portion 42 that holds the closed posture of the restraint member 10.

As described above, first, the fixing auxiliary member 30 is used to temporarily fix the base fixing portion 13 to the base metal fitting 70 before the fastening by the first bolt B1. Therefore, the operator is able to perform the fastening operation with the first bolt B1 in a state in which both hands are free, and the workability is excellent.

In addition, the fixing auxiliary member 30 maintains the mounted state even after the first bolt B1 is fastened, and the main body portion 31 of the fixing auxiliary member 30 is interposed between the connecting portion 72 of the base metal fitting 70 and each of the pair of plate bodies constituting the base fixing portion 13 on both sides thereof. Second, the fixing auxiliary member 30 is used as a spacer for preventing the base metal fitting 70 and the base fixing portion 13 from coming into direct contact with each other. By ensuring a separation width between the pair of plate bodies constituting the base fixing portion 13, and ensuring a separation width between the pair of tightening main body portions 17 of the tightening action portion 16, a tightening allowance for the tightening action portion 16 is ensured by fastening the second bolt B2.

Further, in the present embodiment, since the fixing auxiliary member 30 interposed between the base metal fitting 70 and the base fixing portion 13 is made of a resin having a low thermal conductivity, the heat transfer from the base fixing portion 13 to the base metal fitting 70 is significantly suppressed. Third, the fixing auxiliary member 30 is used as a heat insulating material that suppresses heat transfer from the base fixing portion 13 to the base metal fitting 70. In a case in which the pipe P is a refrigerant pipe as in the present embodiment, heat (for example, cold heat) of the refrigerant circulating in the pipe P is able to be transmitted to the metal restraint member 10 via the pipe P. Even in this case, the fixing auxiliary member 30 is able to function as the heat insulating material, and the cold heat thereof is able to be prevented from being transmitted to the base metal fitting 70. As a result, it is possible to suppress the condensation on the surface of the base metal fitting 70.

Second Embodiment

A second embodiment of the pipe support member will be described with reference to the accompanying drawings. In the pipe support member 1 according to the present embodiment, the specific shape of the tightening action portion 16 and the specific shape of the distal end bending portion 18 that functions as the proximity restricting portion 19 are different from those of the first embodiment. Hereinafter, the pipe support member 1 according to the present embodiment will be mainly described with reference to the differences from the first embodiment. For the points that are not particularly described, the same points as those in the first embodiment are applied, and the same reference numerals are used to omit the detailed description thereof.

Figure 7:
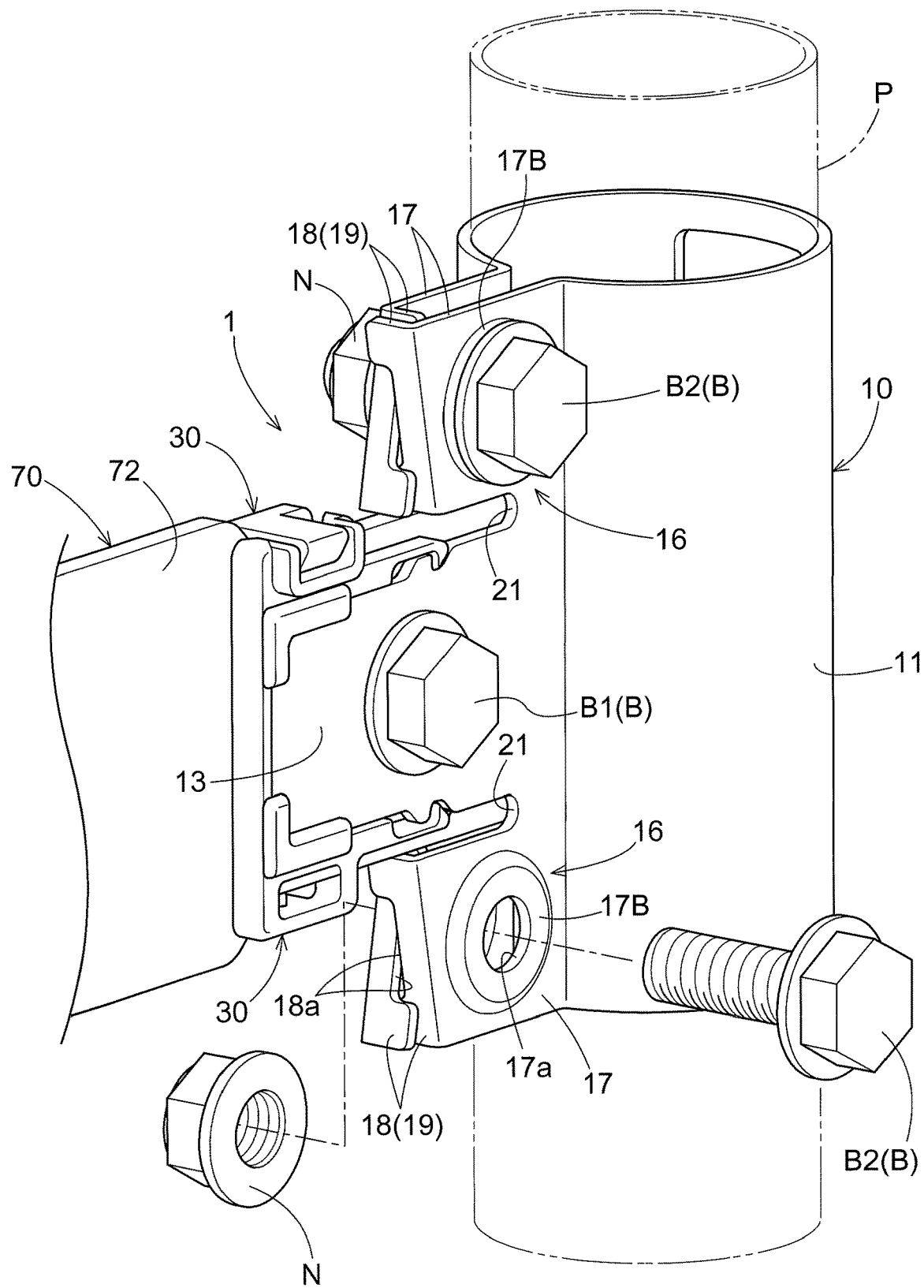
FIG. 7 is a perspective view of a pipe fixing structure using a pipe support member according to a second embodiment.

As illustrated in FIG. 7, the tightening main body portion 17 constituting the tightening action portion 16 according to the present embodiment is formed in a substantially trapezoidal shape. In the present embodiment, upper and lower two tightening main body portions 17 (tightening main body portions 17 located on the front side in the example of FIG. 7) extending from one end of the holding portion 11 in the circumferential direction are formed in a reverse trapezoidal shape in which the upper side is longer than the lower side. On the other hand, the two upper and lower tightening main body portions 17 (tightening main body portions 17 located on the back side in the example of FIG. 7) extending from the other end of the holding portion 11 in the circumferential direction are formed in a true trapezoidal shape in which the lower side is longer than the upper side. As a result, the true trapezoidal-shaped tightening main body portion 17 and the reverse trapezoidal-shaped tightening main body portion 17 are disposed to face each other on the upper side and the lower side, respectively.

A raised portion 17B that rises outward is formed at a center of the tightening main body portion 17. The raised portion 17B is formed in a circular shape. The raised portion 17B functions as a circular rib and improves the strength of the tightening main body portion 17. In the present embodiment, the insertion hole 17a into which the second bolt B2 is inserted is formed at a center of the raised portion 17B.

Figure 8:
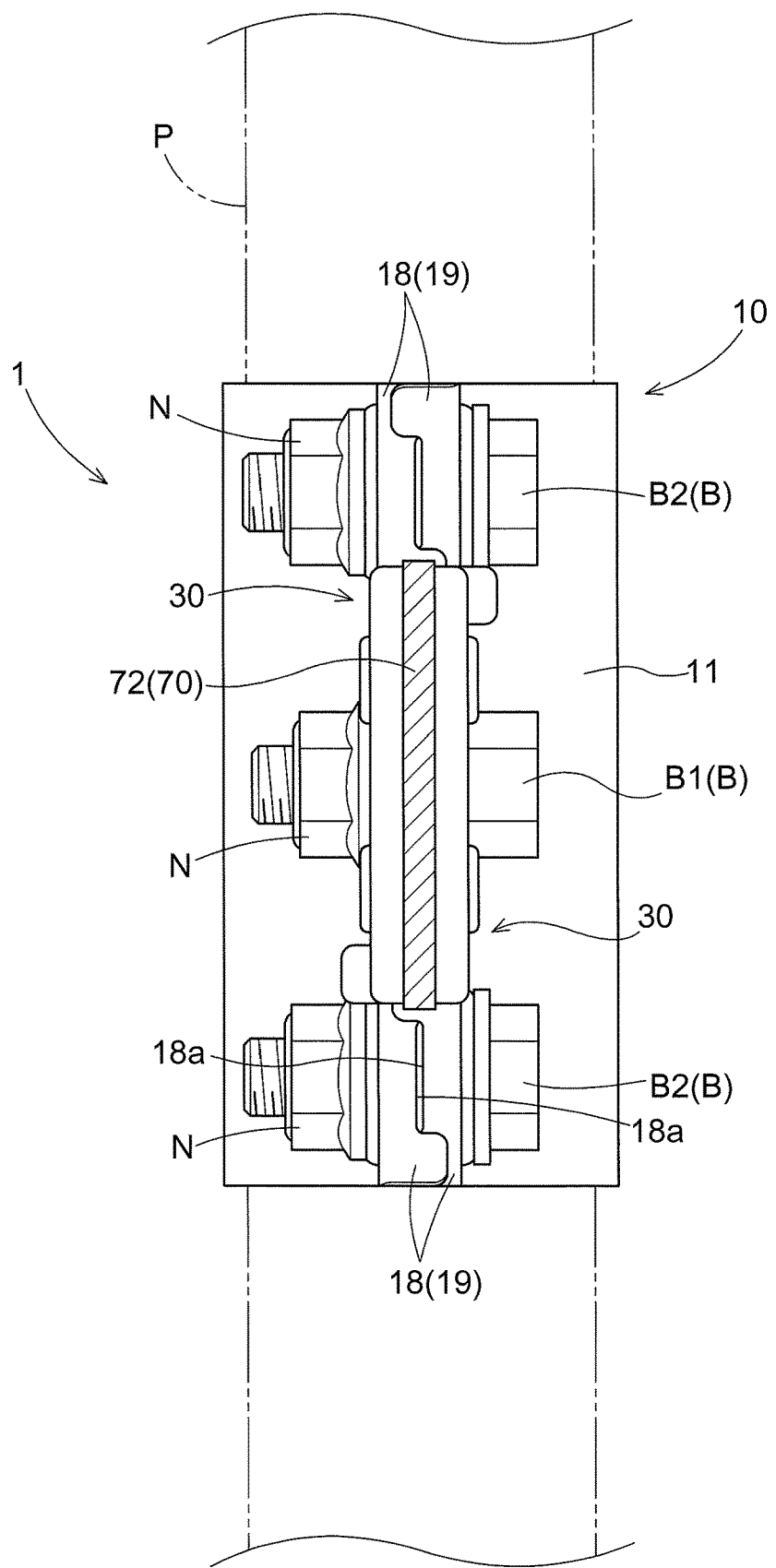
FIG. 8 is a side view of a pipe fixing structure.

As illustrated in FIGS. 7 and 8, the distal end bending portions 18, in which the distal end portions of the tightening main body portions 17 on the side opposite to the holding portions 11 are bent, abut against each other in a state of intersecting with each other. In the present embodiment, the distal end bending portion 18 has a substantially rectangular notch recess portion 18a in a central region in the up-down direction. The distal end bending portions 18 of the pair of opposing tightening action portions 16 intersect and abut against each other in a state in which the respective notch recess portions 18a face each other. With such a configuration, the tightening force due to the fastening of the second bolt B2 is able to be uniformly applied to the pair of tightening action portions 16. As a result, by forming the circular raised portion 17B, the strength of the tightening main body portion 17 itself is increased, and the pipe P is able to be stably supported with almost no deformation or deviation of the tightening action portion 16.

Other Embodiments (1) In each of the above-described embodiments, a configuration is described as an example in which the tightening action portion 16 includes the tightening main body portion 17 and the distal end bending portion 18, and the distal end bending portion 18 functions as the proximity restricting portion 19. However, the configuration is not limited to this, and for example, a part of the tightening main body portion 17 may be formed to have a protrusion, and the protrusion may be configured to function as the proximity restricting portion 19. In this case, the protrusion as an example of the proximity restricting portion 19 may be formed integrally with the tightening main body portion 17 by, for example, a drawing process, or the like, or may be formed separately from the tightening main body portion 17 and fixed to the tightening main body portion 17.

(2) In each of the above-described embodiments, a configuration is described as an example in which the tightening action portion 16 includes the proximity restricting portion 19. However, the configuration is not limited to this, and the tightening action portion 16 may not have the proximity restricting portion 19. In this case, the tightening action portion 16 is able to be configured at least by a pair of the tightening main body portions 17 that are disposed to face each other with a predetermined interval in at least two boundary portions between the holding portions 11 and the pair of the tightening action portions 16.

(3) In each of the above-described embodiments, a configuration is described as an example in which the notch portion 21 is provided between the base fixing portion 13 and the two tightening action portions 16. However, the configuration is not limited to this, and the notch portion 21 may not be provided. In addition, instead of the notch portion 21, as means (tightening force transmission reducing means) for preventing the transmission of the tightening force of the tightening action portion 16 exerted by the fastening of the second bolt B2 to the base fixing portion 13 side, for example, a simple notch, an easily deformable portion, or the like may be provided.

(4) In each of the above-described embodiments, a configuration is described as an example in which the two tightening action portions 16 always abut against the base metal fitting 70 from above and below in a state in which the base fixing portion 13 is fixed to the base metal fitting 70. However, the configuration is not limited to this, and the tightening action portion 16 and the base metal fitting 70 may not always abut against each other. In this case, for example, the tightening action portion 16 and the base metal fitting 70 may be disposed with a slight gap therebetween, and the tightening action portion 16 may be configured to immediately abut against the base metal fitting 70 when being slightly tilted upward or downward.

(5) In each of the above-described embodiments, a configuration is described as an example in which the holding portion 11 is integrally formed in a semi-open substantially cylindrical shape. However, the configuration is not limited to this, and the holding portion 11 may be configured by a pair of semi-cylindrical half bodies. The pair of half bodies may be configured in a hinge type that is connected at a pivotal support portion open and close freely, or may be configured in a set type having a locking portion and a locked portion.

(6) In each of the above-described embodiments, means for preventing the pipe P from deviating in the axial direction in the holding state may be provided in the holding portion 11. The deviation prevention means may be configured by, for example, a locking protrusion that is formed to protrude from the inner surface of the holding portion 11, or may be realized by a roughening process (for example, a sandblast process) with respect to the inner surface of the holding portion 11.

(7) In each of the above-described embodiments, a configuration is described as an example in which the fixing auxiliary member 30 is made of a resin. However, the configuration is not limited to this, and the fixing auxiliary member 30 may be made of, for example, metal.

(8) In each of the above-described embodiments, a configuration is described as an example in which the pipe support member 1 includes the restraint member 10 and the fixing auxiliary member 30 attachably and detachably provided to the restraint member 10. However, the configuration is not limited to this, and the pipe support member 1 may be configured of only the restraint member 10 without including the fixing auxiliary member 30. In this case, a portion having the same function as the closed posture holding portion 42 provided in the fixing auxiliary member 30 according to the embodiment described above may be integrally provided in the restraint member 10.

(9) The configurations disclosed in each of the above-described embodiments (including each of the above-described embodiments and other embodiments; the same applies hereinafter) are also able to be applied in combination with the configurations disclosed in other embodiments as long as there is no contradiction. Even for other configurations, the embodiments disclosed in the present specification are merely examples in all respects, and the configurations are able to be appropriately modified within a range not departing from the gist of the present disclosure.

DESCRIPTION OF REFERENCE NUMERALS

1: pipe support member
11: holding portion
13: base fixing portion
16: tightening action portion
17: tightening main body portion
18: distal end bending portion
19: proximity restricting portion
21: notch portion
30: fixing auxiliary member
70: base metal fitting
S: structure
P: pipe
B1: first bolt
B2: second bolt

The invention claimed is:

1. A pipe support member that is connected to a base metal fitting fixed to a structure to support a pipe, comprising:
a holding portion configured to surround an outer peripheral surface of the pipe to hold the pipe;
base fixing portions configured to extend from the holding portion to face each other and be fixed to the base metal fitting by fastening a first bolt; and
two pairs of tightening action portions configured to extend from the holding portion to face each other and apply a tightening force to the holding portion by fastening a second bolt different from the first bolt,
wherein the tightening action portions apply the tightening force to the holding portion in a state in which two base fitting portions extend from the holding portion and are between the pairs of tightening action portions, wherein the pairs of tightening action portions are spaced apart from each other.

2. The pipe support member according to claim 1, wherein the tightening action portions comprise tightening main body portions to which the second bolt is fastened, and have proximity restricting portions configured to abut against each other during the fastening by the second bolt on a side opposite to the holding portion with respect to a fastening position by the second bolt in the tightening main body portions to maintain a certain distance between the tightening main body portions.

3. The pipe support member according to claim 2, wherein the proximity restricting portions are formed of distal end bending portions that are formed by bending distal ends of the tightening main body portions.

4. The pipe support member according to claim 3, wherein respective distal end bending portions comprising a pair of the tightening action portions abut against each other in a state of intersecting with each other.

5. The pipe support member according to claim 1, wherein the holding portion, the base fixing portions, and the tightening action portions are integrally formed, and a notch portion for preventing the tightening force by the fastening of the second bolt from being transmitted to a base fixing portion side is provided between the base fixing portions and the tightening action portions.

6. The pipe support member according to claim 1, wherein each of the tightening action portions is provided adjacent to at least one of an upper side and a lower side of the base fixing portion, and wherein the tightening action portions abut against the base metal fitting in a state in which the base fixing portions are fixed to the base metal fitting.

7. The pipe support member according to claim 1, further comprising:

fixing auxiliary members configured to temporarily fix the base fixing portions to the base metal fitting before the fastening by the first bolt.

8. The pipe support member according to claim 7, wherein the fixing auxiliary members are made of a resin and serve as a spacer for preventing the base metal fitting and the base fixing portions from directly coming into contact with each other.

9. A pipe support member that is connected to a base metal fitting fixed to a structure to support a pipe, comprising:

a holding portion configured to surround an outer peripheral surface of the pipe to hold the pipe;

base fixing portions configured to extend from the holding portion to face each other and be fixed to the base metal fitting by fastening a first bolt; and tightening action portions configured to extend from the holding portion to face each other and apply a tightening force to the holding portion by fastening a second bolt different from the first bolt, wherein the tightening action portions comprise tightening main body portions to which the second bolt is fastened, and have proximity restricting portions configured to abut against each other during the fastening by the second bolt on a side opposite to the holding portion with respect to a fastening position by the second bolt in the tightening main body portions to maintain a certain distance between the tightening main body portions.

10. A pipe support member that is connected to a base metal fitting fixed to a structure to support a pipe, comprising:

a holding portion configured to surround an outer peripheral surface of the pipe to hold the pipe;

base fixing portions configured to extend from the holding portion to face each other and be fixed to the base metal fitting by fastening a first bolt; and tightening action portions configured to extend from the holding portion to face each other and apply a tightening force to the holding portion by fastening a second bolt different from the first bolt, wherein the holding portion, the base fixing portions, and the tightening action portions are integrally formed, and a notch portion for preventing the tightening force by the fastening of the second bolt from being transmitted to a base fixing portion side is provided between the base fixing portions and the tightening action portions.

* * * * *